United States Patent
Al-Mohssen et al.

(10) Patent No.: US 10,528,068 B2
(45) Date of Patent: *Jan. 7, 2020

(54) WEATHER INDUCED DEMAND RESPONSE DISPATCH SYSTEM

(71) Applicant: ENERNOC, INC., Boston, MA (US)

(72) Inventors: Husain Al-Mohssen, Dedham, MA (US); Angela S. Bassa, Stoneham, MA (US); Richard R. Paradis, Franklin, MA (US)

(73) Assignee: Enel X North America, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,651

(22) Filed: Feb. 23, 2018

(65) Prior Publication Data

US 2018/0188759 A1    Jul. 5, 2018

Related U.S. Application Data

(63) Continuation of application No. 14/674,021, filed on Mar. 31, 2015, now Pat. No. 9,977,447.

(51) Int. Cl.
*G05D 3/12* (2006.01)
*G05D 5/00* (2006.01)
(Continued)

(52) U.S. Cl.
CPC .............. *G05F 1/66* (2013.01); *G05B 13/026* (2013.01); *G05B 15/02* (2013.01); *G06Q 10/04* (2013.01);
(Continued)

(58) Field of Classification Search
CPC ..... G05B 13/048; G05F 1/66; H02J 2003/003; H02J 2003/007; H02J 3/005
See application file for complete search history.

(56) References Cited

U.S. PATENT DOCUMENTS 4,090,088 A    5/1978  McMahon et al.
4,168,491 A    9/1979  Phillips et al.
(Continued)

OTHER PUBLICATIONS

Conca, James. "Demand Response Is How the Smart Grid Will Save Us Billions." Feb. 24, 2015 Forbes. pp. 1-5.
(Continued)

*Primary Examiner* — Zhipeng Wang
(74) *Attorney, Agent, or Firm* — Richard K. Huffman

(57) ABSTRACT

A method for dispatching buildings in a demand response program event including generating data sets for each of the buildings, each set having energy consumption values along with corresponding time and outside temperature values, where the energy consumption values within each set are shifted by one of a plurality of lag values relative to the corresponding time and outside temperature values, and where each of the plurality of lag values is different from other ones of the plurality of lag values; performing a non-linear parabolic analysis on each set to yield machine learning model parameters and a residual; determining a least valued residual from all residuals yielded, the least valued residual indicating a corresponding energy lag for the each of the buildings; and using energy lags for all of the buildings to generate a dispatch schedule for the demand response program event according to a prioritization of the energy lags.

12 Claims, 8 Drawing Sheets

FINE-GRAINED BASELINE ENERGY DATA WEATHER NORMALIZATION APPARATUS

(51) Int. Cl.

| | | |
|---|---|---|
| *G05D 9/00* | (2006.01) | |
| *G05D 11/00* | (2006.01) | |
| *G05D 17/00* | (2006.01) | |
| *G05F 1/66* | (2006.01) | |
| *G05B 15/02* | (2006.01) | |
| *H04L 12/28* | (2006.01) | |
| *G05B 13/02* | (2006.01) | |
| *H02J 3/00* | (2006.01) | |
| *G06Q 50/06* | (2012.01) | |
| *G06Q 10/04* | (2012.01) | |

(52) U.S. Cl.
CPC ............... *G06Q 50/06* (2013.01); *H02J 3/00* (2013.01); *H04L 12/2816* (2013.01); *G05B 2219/2642* (2013.01); *H02J 2003/003* (2013.01); *Y02B 70/3241* (2013.01); *Y02P 80/11* (2015.11); *Y04S 20/227* (2013.01)

(56) References Cited

U.S. PATENT DOCUMENTS

| | | |
|---|---|---|
| 4,228,364 A | 10/1980 | Walden |
| 7,324,876 B2 | 1/2008 | Ying |
| 7,552,100 B2 | 6/2009 | Chen |
| 7,565,227 B2 | 7/2009 | Richard et al. |
| 7,881,889 B2 | 2/2011 | Barclay et al. |
| 8,019,567 B2 | 9/2011 | Steinberg et al. |
| 8,355,827 B2 | 1/2013 | Egnor et al. |
| 8,370,283 B2 | 2/2013 | Pitcher et al. |
| 8,401,709 B2 | 3/2013 | Cherian et al. |
| 8,417,391 B1 | 4/2013 | Rombouts et al. |
| 8,706,650 B2 | 4/2014 | Ozog |
| 8,751,054 B2 | 6/2014 | Wang et al. |
| 9,153,965 B2 | 10/2015 | Deshpande et al. |
| 9,158,322 B2 | 10/2015 | Willig |
| 9,196,009 B2* | 11/2015 | Drees .................. G05B 15/02 |
| 9,244,444 B2 | 1/2016 | Carty et al. |
| 9,292,888 B2 | 3/2016 | An et al. |
| 9,355,069 B2 | 5/2016 | Elbsat et al. |
| 9,569,804 B2 | 2/2017 | Stein et al. |
| 2004/0254686 A1 | 12/2004 | Matsui et al. |
| 2005/0043862 A1* | 2/2005 | Brickfield ............... H02J 3/008 |
| | | 700/295 |
| 2009/0012653 A1 | 1/2009 | Cheng et al. |
| 2009/0177520 A1 | 7/2009 | Bateni et al. |
| 2010/0222935 A1 | 9/2010 | Forbes, Jr. et al. |
| 2010/0286937 A1 | 11/2010 | Hedley et al. |
| 2010/0318227 A1* | 12/2010 | Steinberg ........... G05D 23/1931 |
| | | 700/278 |
| 2011/0119042 A1 | 5/2011 | Johnson et al. |
| 2011/0130886 A1* | 6/2011 | Drees .................. G05B 15/02 |
| | | 700/291 |
| 2011/0190951 A1* | 8/2011 | Lee ........................ G05D 23/19 |
| | | 700/291 |
| 2011/0231320 A1 | 9/2011 | Irving |
| 2012/0046796 A1 | 2/2012 | Zhang |
| 2012/0185106 A1 | 7/2012 | Ghosh et al. |
| 2012/0278051 A1 | 11/2012 | Jiang et al. |
| 2012/0330626 A1 | 12/2012 | An et al. |
| 2013/0024141 A1* | 1/2013 | Marwah ................ G06Q 10/04 |
| | | 702/61 |
| 2013/0041853 A1 | 2/2013 | Shnekendorf et al. |
| 2013/0073273 A1 | 3/2013 | Madrazo et al. |
| 2013/0297092 A1 | 11/2013 | Willig et al. |
| 2013/0304269 A1* | 11/2013 | Shiel ...................... G06Q 50/06 |
| | | 700/291 |
| 2013/0346768 A1 | 11/2013 | Forbes, Jr. et al. |
| 2014/0148953 A1 | 5/2014 | Nwankpa et al. |
| 2014/0297238 A1* | 10/2014 | Parthasarathy ..... G06F 17/5004 |
| | | 703/2 |
| 2015/0006294 A1 | 1/2015 | Irmak et al. |
| 2015/0057820 A1 | 2/2015 | Kefayati et al. |
| 2015/0076926 A1 | 3/2015 | Kosaka et al. |
| 2015/0088442 A1 | 3/2015 | Farrar et al. |
| 2015/0169795 A1* | 6/2015 | Elbsat ................. G06F 17/5009 |
| | | 703/2 |
| 2015/0198961 A1* | 7/2015 | Shiel .................... F24D 19/1048 |
| | | 700/291 |
| 2015/0198962 A1* | 7/2015 | Shiel .................... F24D 19/1048 |
| | | 700/291 |
| 2015/0207752 A1 | 7/2015 | Birkestrand et al. |
| 2015/0227846 A1* | 8/2015 | Mercer ................. G05B 15/02 |
| | | 700/295 |
| 2016/0195887 A1 | 7/2016 | Shiel |
| 2016/0266181 A1 | 9/2016 | Kawaguchi et al. |
| 2016/0281607 A1 | 9/2016 | Asati et al. |
| 2016/0291067 A1 | 10/2016 | Al-Mohssen et al. |
| 2016/0291561 A1 | 10/2016 | Al-Mohssen et al. |
| 2016/0291562 A1 | 10/2016 | Al-Mohssen et al. |
| 2016/0291616 A1 | 10/2016 | Al-Mohssen et al. |
| 2016/0291622 A1 | 10/2016 | Al-Mohssen et al. |
| 2016/0291623 A1 | 10/2016 | Al-Mohssen et al. |
| 2016/0291624 A1 | 10/2016 | Al-Mohssen et al. |
| 2016/0292577 A1 | 10/2016 | Al-Mohssen et al. |
| 2016/0294185 A1 | 10/2016 | Al-Mohssen et al. |
| 2016/0294186 A1 | 10/2016 | Al-Mohssen et al. |
| 2016/0305678 A1 | 10/2016 | Pavlovski et al. |
| 2016/0363948 A1 | 12/2016 | Steven et al. |
| 2018/0341283 A1 | 11/2018 | Al-Mohssen et al. |
| 2018/0356849 A1 | 12/2018 | Al-Mohssen et al. |
| 2018/0356850 A1 | 12/2018 | Al-Mohssen et al. |
| 2018/0356851 A1 | 12/2018 | Al-Mohssen et al. |
| 2019/0004555 A1 | 1/2019 | Al-Mohssen et al. |
| 2019/0018438 A1 | 1/2019 | Al-Mohssen et al. |
| 2019/0044328 A1 | 2/2019 | Al-Mohssen et al. |
| 2019/0044329 A1 | 2/2019 | Al-Mohssen et al. |
| 2019/0044330 A1 | 2/2019 | Al-Mohssen et al. |
| 2019/0044331 A1 | 2/2019 | Al-Mohssen et al. |

OTHER PUBLICATIONS

Lamonica, Martin. "Green Biz 101: What do you Need to Know About Demand Response?" Apr. 29, 2014 GreenBiz 101. pp. 1-9.

* cited by examiner

5-PARAMETER REGRESSION MODEL DERIVED FROM FINE-GRAINED USAGE DATA

FINE-GRAINED BASELINE ENERGY DATA WEATHER NORMALIZATION APPARATUS

*FINE-GRAINED BASELINE ENERGY DATA WEATHER NORMALIZATION METHOD*

WEATHER INDUCED FACILITY ENERGY CONSUMPTION CHARACTERIZATION SYSTEM

WEATHER INDUCED DEMAND RESPONSE DISPATCH SYSTEM

CROSS-REFERENCE TO RELATED APPLICATIONS

This application is a continuation of the following U.S. patent application, each of which is herein incorporated by reference for all intents and purposes.

| SERIAL NUMBER | FILING DATE | TITLE |
| --- | --- | --- |
| 14/674,021 | Mar. 31, 2015 | DEMAND RESPONSE DISPATCH SYSTEM EMPLOYING WEATHER INDUCED FACILITY ENERGY CONSUMPTION CHARACTERIZATIONS |

This application is related to the following co-pending U.S. patent applications, each of which has a common assignee and common inventors.

| SERIAL NUMBER | FILING DATE | TITLE |
| --- | --- | --- |
| 14/674,004 | Mar. 31, 2015 | SYSTEM FOR WEATHER INDUCED FACILITY ENERGY CONSUMPTION CHARACTERIZATION |
| 14/984,612 | Dec. 30, 2015 | WEATHER INDUCED FACILITY ENERGY CONSUMPTION CHARACTERIZATION MECHANISM |
| 14/984,706 | Dec. 30, 2015 | APPARATUS AND METHOD FOR EMPLOYING WEATHER INDUCED FACILITY ENERGY CONSUMPTION CHARACTERIZATIONS IN A DEMAND RESPONSE DISPATCH SYSTEM |
| 15/903,533 | Feb. 23, 2018 | DISPATCH SYSTEM EMPLOYING WEATHER INDUCED FACILITY ENERGY CONSUMPTION CHARACTERIZATIONS |
| 15/903,596 | Feb. 23, 2018 | SYSTEM FOR DEMAND RESPONSE DISPATCH EMPLOYING WEATHER INDUCED FACILITY ENERGY CONSUMPTION CHARACTERIZATIONS |
| 15/903,705 | Feb. 23, 2018 | DEMAND RESPONSE DISPATCH SYSTEM EMPLOYING WEATHER INDUCED ENERGY CONSUMPTION |
| 14/674,033 | Mar. 31, 2015 | DEMAND RESPONSE DISPATCH PREDICTION SYSTEM |
| 14/984,785 | Dec. 30, 2015 | APPARATUS AND METHOD FOR PREDICTION OF A DEMAND RESPONSE DISPATCH |
| 14/674,041 | Mar. 31, 2015 | ENERGY BROWN OUT PREDICTION SYSTEM |
| 14/984,872 | Dec. 30, 2015 | APPARATUS AND METHOD FOR PREDICTION OF AN ENERGY BROWN OUT |
| 14/674,057 | Mar. 31, 2015 | APPARATUS AND METHOD FOR DEMAND COORDINATION NETWORK CONTROL |

BACKGROUND OF THE INVENTION

Field of the Invention

This invention relates in general to the field of energy management, and more particularly to a demand response dispatch system employing weather induced facility energy consumption characterizations.

Description of the Related Art

One problem with resources such as electricity, water, fossil fuels, and their derivatives (e.g., natural gas) is related to supply and demand. That is, production of a resource often is not in synchronization with demand for the resource. In addition, the delivery and transport infrastructure for these resources is limited in that it cannot instantaneously match production levels to provide for constantly fluctuating consumption levels. As anyone who has participated in a rolling blackout will concur, the times are more and more frequent when resource consumers are forced to face the realities of limited resource production.

Another problem with resources such as water and fossil fuels (which are ubiquitously employed to produce electricity) is their limited supply along with the detrimental impacts (e.g., carbon emissions) of their use. Public and political pressure for conservation of resources is prevalent, and the effects of this pressure is experienced across the spectrum of resource providers, resource producers and managers, and resource consumers.

It is no surprise, then, that the electrical power generation and distribution community has been taking proactive measures to protect limited instantaneous supplies of electrical power by 1) imposing demand charges on consumers in addition to their monthly usage charge and 2) providing incentives for conservation in the form of rebates and reduced charges. In prior years, consumers merely paid for the total amount of power that they consumed over a billing period. Today, most energy suppliers are not only charging customers for the total amount of electricity they have consumed over the billing period, but they are additionally charging for peak demand. Peak demand is the greatest amount of energy that a customer uses during a measured period of time, typically on the order of minutes. In addition, energy suppliers are providing rebate and incentive programs that reward consumers for so called energy efficiency upgrades (e.g., lighting and surrounding environment controlled by occupancy sensors, efficient cooling and refrigeration, etc.) in their facilities that result in reductions of both peak and overall demand. Similar programs are prevalent in the water production and consumption community as well.

Demand reduction and energy efficiency programs may be implemented and administered directly by energy providers (i.e., the utilities themselves) or they may be contracted out to third parties, so called energy services companies (ESCOs). ESCOs directly contract with energy consumers and also contract with the energy providers to, say, reduce the demand of a certain resource in a certain area by a specified percentage, where the reduction may be constrained to a certain period of time (i.e., via a demand response program) or the reduction may permanent (i.e., via an energy efficiency program).

The above examples are merely examples of the types of programs that are employed in the art to reduce consumption and foster conservation of limited resources. Regardless of the vehicle that is employed, what is important to both producers and consumers is that they be able to understand and appreciate the effects of demand reduction and efficiency actions that are performed, say, on individual buildings. How does a building manager know that the capital outlay made to replace 400 windows will result in savings that allow for return of capital within three years? How does an ESCO validate for a contracting regional transmission operator (e.g., Tennessee Valley Authority) that energy efficiency programs implemented on 1,000 consumers will result in a 15 percent reduction in baseline power consumption?

The answers to the above questions are not straightforward, primarily because, as one skilled in the art will appreciate, weather drives consumption. Weather is not the only driver in consumption, but it is significant. For instance, how can a building's energy consumption in January of one year be compared to its consumption in January of another year when average temperatures in the two months being compared differ by 25 degrees? Is the difference between the two month's power consumption due to weather, or implementation of an energy efficiency program, or a combination of both?

Fortunately, those in the art have developed complex, but widely accepted, normalization techniques that provide for weather normalization of energy use data so that consumption by a building in two different months can be compared without the confusion associated with how outside temperature affects energy use. These modeling techniques provide for normalization of energy use data for buildings and groups of buildings, and they are accurate for the above purposes when employed for energy use periods typically ranging from years down to days. That is, given sufficient historical energy use data ("baseline data"), a model can be developed using these normalization techniques that can be used to accurately estimate the energy consumption of the building as a function of outside temperature. These estimates are used to remove weather effects from an energy use profile and also to predict energy use as a function of temperature.

The present inventors have observed, however, that conventional normalization techniques, utterly fail to be accurate and useful when energy use data granularity is less than a 24-hour period. Normalization models that are derived from energy use data having granularities on the order of six hours, one hour, 15 minutes, etc., have been shown to be exceedingly deficient in accuracy and are thus unreliable.

Accordingly, what is needed is a technique that provides for accurately estimating energy use as a function of temperature, where the technique is derived from and is applicable to, energy consumption periods less than 24 hours.

What is also needed is an apparatus and method for employing fine-grained (i.e., less than 24 hours) energy use data to derive an accurate model for energy use based upon outside temperature.

What is additionally needed is a fine-grained baseline energy data weather normalization apparatus and method.

What is further needed is a system for characterizing a building's energy consumption as a function of temperature that is applicable at resolutions less than one day.

What is moreover needed are mechanisms that understand and employ the transient energy use responses of buildings for purposes of energy consumption predictions covering individual buildings, groups of buildings, and larger areas.

SUMMARY OF THE INVENTION

The present invention, among other applications, is directed to solving the above noted problems and addresses other problems, disadvantages, and limitations of the prior art by providing a superior technique for accurately establishing an energy consumption baseline using consumption data having a much finer granularity than that which has heretofore been provided. In one embodiment, a demand response dispatch system is provided. The system includes baseline data stores, a building lag optimizer, a dispatch processor, and a dispatch control element. The baseline data stores is configured to store a plurality of baseline energy use data sets for buildings participating in a demand response program. The building lag optimizer is configured to receive identifiers for the buildings, and is configured to generate energy use data sets for each of the buildings, each of the energy use data sets having energy consumption values along with corresponding time and outside temperature values, where the energy consumption values within the each of the energy use data sets are shifted by one of a plurality of lag values relative to the corresponding time and outside temperature values, and where each of the plurality of lag values is different from other ones of the plurality of lag values, and is configured to perform a non-linear parabolic analysis on the each of the energy use data sets to yield corresponding non-linear parabolic parameters and a corresponding residual, and is configured to determine a least valued residual from all residuals yielded, the least valued residual indicating a corresponding energy lag for the each of the buildings, and non-linear parabolic parameters that correspond to the least valued residual, and where the corresponding energy lag describes a transient energy consumption period preceding a change in outside temperature. The dispatch processor, coupled to the building lag optimizer is configured to receive a plurality of energy lags, each corresponding to one of the buildings, and is configured to generate a dispatch schedule for a demand response program event according to a prioritization of the plurality of energy lags. The dispatch control element is coupled to the dispatch processor, and is configured to control a specified load shedding by performing load shedding actions in the order provided by the dispatch schedule, where the dispatch schedule directs for dispatch of ones of the buildings having greater energy lags prior to others of the buildings having lesser energy lags.

One aspect of the present invention contemplates a system for dispatching buildings participating in a demand response program event. The system has baseline data stores, a building lag optimizer, a dispatch processor, and a dispatch control element. The baseline data stores is configured to store a plurality of baseline energy use data sets the buildings. The building lag optimizer is configured to determine an energy lag for one of the buildings. The building lag optimizer includes a thermal response processor and a non-linear parabolic engine. The thermal response processor is configured to generate a plurality of energy use data sets for the one of the buildings, each of the plurality of energy use data sets comprising energy consumption values along with corresponding time and outside temperature values, where the energy consumption values within the each of the plurality of energy use data sets are shifted by one of a plurality of lag values relative to the corresponding time and outside temperature values, and where each of the plurality of lag values is different from other ones of the plurality of lag values. The non-linear parabolic engine is coupled to the thermal response processor and is configured to receive the plurality of energy use data sets, and is configured to perform a non-linear parabolic analysis on the each of the plurality of energy use data sets to yield corresponding non-linear parabolic parameters and a corresponding residual. The thermal response processor determines a least valued residual from all residuals yielded by the non-linear parabolic engine, the least valued residual indicating the energy lag for the one of the buildings, where the energy lag describes a transient energy consumption period preceding a change in outside temperature. The dispatch processor is coupled to the building lag optimizer and is configured to receive a plurality of energy lags, each corresponding to one of the buildings, and is configured to generate a dispatch schedule for the demand response program event according to a prioritization of the plurality of energy lags. The dispatch control element is coupled to the dispatch processor, and is configured to control a specified load shedding by performing load shedding actions in the order provided by the dispatch schedule, where the dispatch schedule directs for dispatch of ones of the buildings having greater energy lags prior to others of the buildings having lesser energy lags.

Another aspect of the present invention comprehends a method for dispatching buildings participating in a demand response program event. The method includes retrieving a plurality of baseline energy use data sets for the buildings from a baseline data stores; generating a plurality of energy use data sets for each of the buildings, each of the plurality of energy use data sets comprising energy consumption values along with corresponding time and outside temperature values, where the energy consumption values within the each of the plurality of energy use data sets are shifted by one of a plurality of lag values relative to the corresponding time and outside temperature values, and where each of the plurality of lag values is different from other ones of the plurality of lag values; performing a non-linear parabolic analysis on the each of the plurality of energy use data sets to yield corresponding non-linear parabolic parameters and a corresponding residual; determining a least valued residual from all residuals yielded by the non-linear parabolic engine, the least valued residual indicating a corresponding energy lag for the each of the buildings, where the corresponding energy lag describes a transient energy consumption period preceding a change in outside temperature; using energy lags for all of the buildings to generate a dispatch schedule for the demand response program event according to a prioritization of the energy lags; and controlling a specified load shedding by performing load shedding actions in the order provided by the dispatch schedule, wherein the dispatch schedule directs for dispatch of ones of the buildings having greater energy lags prior to others of the buildings having lesser energy lags.

BRIEF DESCRIPTION OF THE DRAWINGS

These and other objects, features, and advantages of the present invention will become better understood with regard to the following description, and accompanying drawings where.

DETAILED DESCRIPTION

Figure 1:
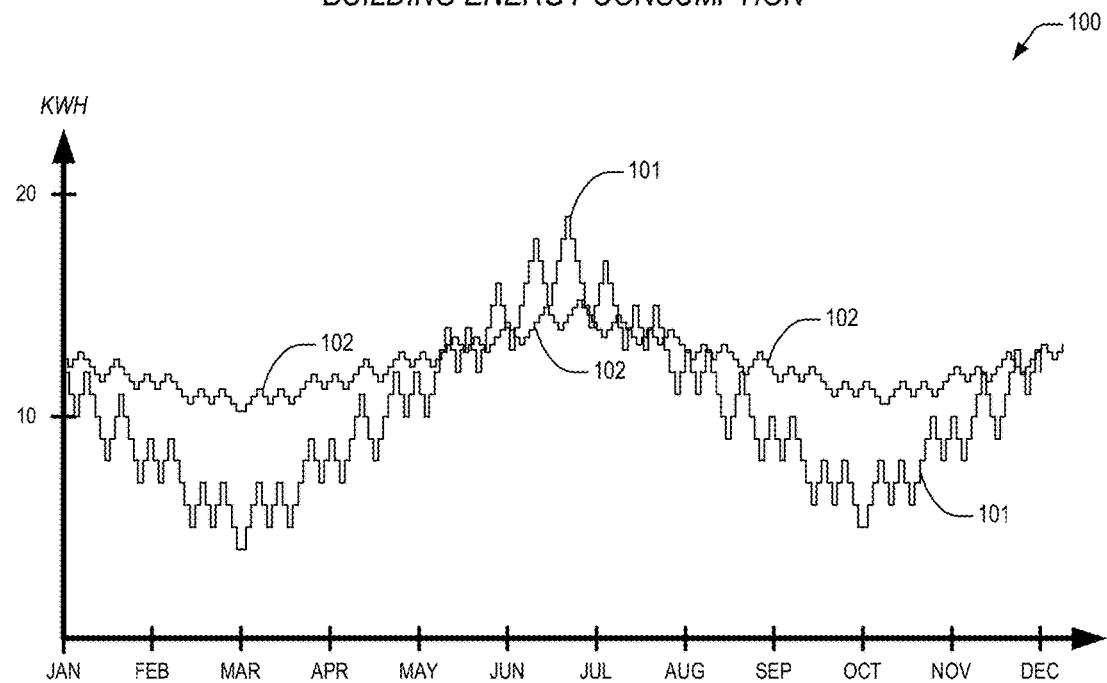
FIG. 1 is a timing diagram illustrating two present day energy consumption profiles for an exemplary building indicating electricity consumed by various components within the building at a level of granularity approximately equal to one week.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system related and business related constraints, which vary from one implementation to another. Furthermore, it will be appreciated that such a development effort might be complex and time consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans), such a special definition will be expressly set forth in the specification in a definitional manner that directly and unequivocally provides the special definition for the term or phrase.

Figure 2:
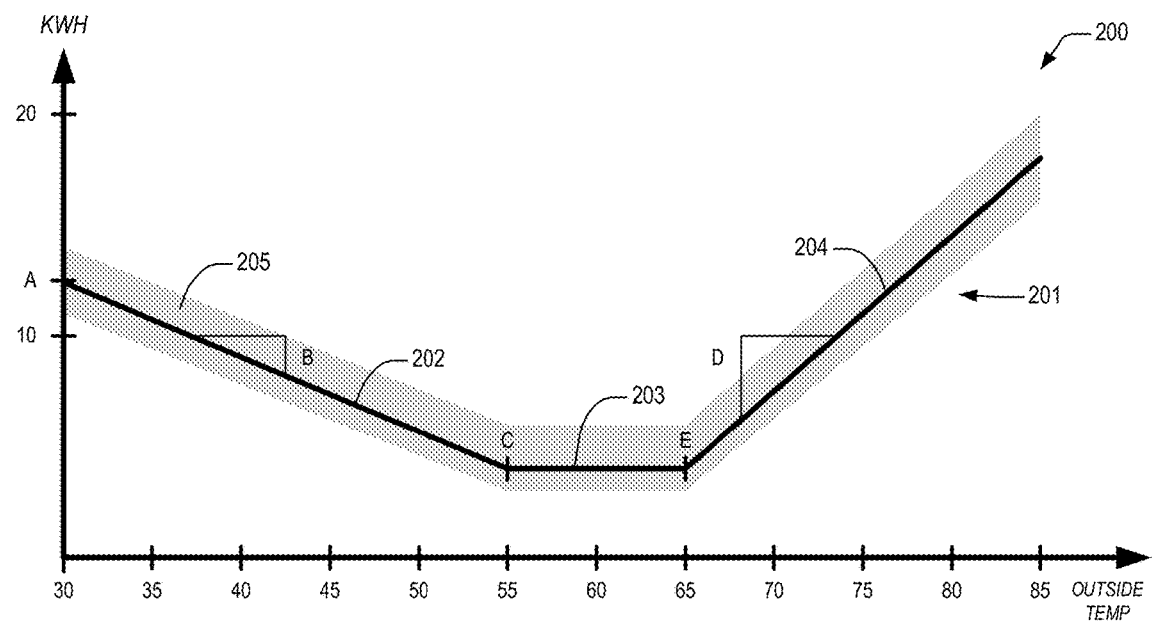
FIG. 2 is a diagram depicting a present day coarse-grained 5-parameter regression baseline model showing energy consumption of the exemplary building as a function of outside temperature, and which is derived from the two energy consumption profiles of FIG. 1.
Figure 3:
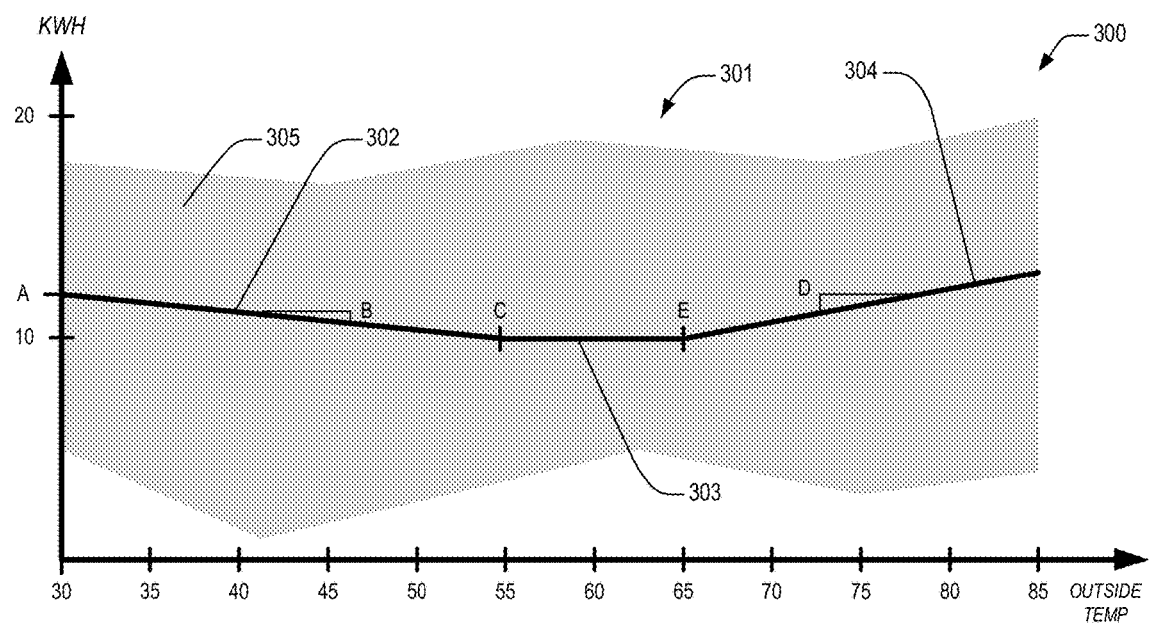
FIG. 3 is a block diagram featuring an exemplary present day 5-parameter regression baseline model for the building of FIG. 1, which is derived from an exemplary energy consumption profile consisting of fine-grained energy consumption data.

In view of the above background discussion on building energy consumption and associated present day techniques employed to develop weather normalized energy consumption baselines that allow for analyses of building energy use, a discussion of the present day techniques and their limitations and disadvantages will now be presented with reference to FIGS. 1-3. Following this, a discussion of the present invention will be presented with reference to FIGS. 4-9. The present invention overcomes the below noted limitations and disadvantages of present day techniques, and others, by providing an apparatus and method that allows for derivation of multiple parameter baseline regression models from fine-grained building energy use data in a manner that is exceedingly more accurate that that which has heretofore been provided.

Turning to FIG. 1, a timing diagram 100 is presented illustrating two present day energy consumption profiles 101-102 for an exemplary building, indicating electricity consumed by various components within the building at a level of granularity approximately equal to one week. The diagram 100 depicts approximate weekly energy consumption 101 over the course of a first year and approximate weekly energy consumption 102 over the course of a second year. Those skilled in the art will appreciate that the two profiles 101-102 are referred to as "baseline energy consumption data" or "baseline data" for the exemplary building. The baseline data does not necessarily have to span a complete year, nor does it have to be at a granularity of one week, though to establish a credible baseline for energy consumption and further modeling and analysis, it is desirable to have a sufficient number of data points so as to fully characterize the span of energy consumption over various weather, occupancy, and other conditions.

Going forward, energy consumption and associated discussions will employ terms corresponding to electrical energy usage (e.g., kilowatts, kilowatt hours) because electrical energy usage and derivation of electrical usage baselines are currently more prevalent in the art. However, the present inventors note that the principles and techniques disclosed herein according to the present invention are equally applicable to other forms of energy such as, but not limited to, water, natural gas, fossil fuels, and nuclear fuels.

Consider profile 101, where roughly 10 kilowatt hours (kWh) of electricity are consumed by the exemplary building during the weeks in January of the first year, decreasing down to a low of roughly 5 kWh during the weeks surrounding March of the first year, and increasing and peaking to slightly under 20 kWh during the summer months, decreasing to a low usage of roughly 5 kWh in the fall, and increasing up to roughly 10 kWh as it turns cold in the fall. Profile 101 is typical of many small- to medium-sized buildings (SMBs) in various locations in the world. These SMBs may comprise heating, ventilation, and air-conditioning (HVAC) systems to control climate within the SMBs at a comfort level supporting occupancy. Such is found in factories, schools, churches, airports, office buildings, etc. The HVAC systems may be very simple, and thermostat controlled, or they may be part of more complex building management systems (BMSs) that may include occupancy sensors, controlled lighting, and mechanisms to actively manage building energy use by varying activation schedules and/or duty cycles of equipment (e.g., compressors, evaporators, condensers, fans, lights, etc.).

Given that electrical energy is generally purchased from a utility provider (e.g. Tennessee Valley Authority), profile 101 implies that there are costs associated with heating the exemplary building that increase during colder weather and that decrease following the colder weather as seasonal temperatures increase. Profile 101 also indicates that there are costs associated with cooling the exemplary building that increase during warmer weather and that decrease following the warmer weather as seasonal temperatures decrease. But heating and cooling costs are not the only components of overall building energy consumption as is shown in profile 101. Other components may be due to energy use as a function of, but not limited to, occupancy, usage of large equipment, lighting, hours of operation, and equipment maintenance or malfunction issues. It is those other components of energy use that are of interest, in addition to energy use as a function of weather, to the present application. Yet, without installing costly and complex energy monitoring equipment within the exemplary facility, it is difficult at best to separate energy consumption as a function of the weather (i.e., "weather induced energy consumption") from the other components of energy use.

To complicate matters, one skilled in the art will also appreciate that weather is not the same from year to year. Accordingly, profile 102 is presented as an example of energy consumption by the same exemplary building in a second year, where it is presumed that the configuration and use of the exemplary building may or may not be different in the first and second years. Yet, a building manager, utility grid manager, or energy service company analyst cannot discern the impact of other energy efficiency or demand reduction mechanisms on the building's energy use without first estimating the effects of weather on the building's energy use, subtracting those effects from the overall usage profiles 101-102, and normalizing those profiles 101-102 to a reference outside temperature (e.g., 65 degrees Fahrenheit (F.)) so that the profiles 101-102 can be compared in a manner that will yield meaningful results. At this point, all that can be derived from the profiles 101-102 of FIG. 1 is that weather in the second year may have been milder that the weather patterns of the first year.

To address the uncertainties associated with determining how much energy an exemplary building should be consuming as a function of weather (namely, outside air temperature), those within the art have fielded standard techniques for estimating the effects of weather on a building's energy consumption, one of which is specified in *Measurement of Energy and Demand Savings*, ASHRAE Guideline 14-2002, published in 2002 by The American Society of Heating, Refrigerating and Air-Conditioning Engineers, Inc. It is not the intent of the present application to provide an in-depth discussion of the different techniques for estimating weather induced energy consumption effects, for this will be evident to those of skill in the art. What is sufficient to note herein is the essence of these techniques and their limitations when employed to estimate weather induced energy consumption effects using fine-grained energy consumption data.

One skilled in the art will further appreciate that there are many applications for a baseline energy consumption model that is derived from coarse-grained or fine-grained energy use data, such coarse-grained data as is represented by the profiles 101-102 of FIG. 1. Once an accurate model of weather induced energy consumption effects has been derived from the profiles 101-102, the model may be employed, among other purposes, to allow for meaningful comparisons of energy usage from period to period (e.g., year to year, month to month, etc.), it may be employed to validate data corresponding to demand reduction or energy efficiency programs, or it may be employed to predict future consumption as a function of weather.

Now turning to FIG. 2, a diagram 200 depicting a present day coarse-grained 5-parameter regression baseline model 201 is presented showing energy consumption of the exemplary building as a function of outside temperature ("weather"). The 5-parameter regression baseline model 201 is derived from the two energy consumption profiles 101-102 of FIG. 1. The model 201 includes a linear heating component 202 that is characterized by an intercept A and a heating slope B. The model 201 also has a baseline consumption component 203 that is characterized by heating change point C and cooling change point E. The model 201 further includes a linear cooling component 204 that is characterized by a cooling slope D. Also shown in the diagram 200 is a shaded distribution area 205 that depicts the distribution boundaries of the energy consumption values of either of the profiles 101-102, or of the energy consumption values of both of the profiles 101-102, depending upon the baseline data that is employed in the 5-parameter regression analysis that results in the model 201 itself. Generally speaking, as one skilled in the art will appreciate, the accuracy of the model 201 is increased in correspondence to the amount of baseline energy consumption data that is used to develop the model 201 via the regression analysis. The temperatures depicted on the axis labeled OUTSIDE TEMP represent average outside temperature for each of the weeks of FIG. 1. For example, weeks in which the average temperature is 55 degrees have their corresponding building energy use values distributed within the shaded area at the 55-degree mark. Weeks in which the average temperature is 75 degrees have their corresponding building energy use values distributed within the shaded area at the 75-degree mark. And so on. The heating component 202, baseline consumption component 203, and cooling component 204, and their corresponding parameters A-E and derived by performing the 5-parameter regression analysis to minimize the residual error term (typically mean squared error between estimate and actual data points). Thus, the model 201 represents a minimized-residual 5-parameter equation that may be employed to generate an estimate of energy consumption by the exemplary building for a given outside temperature. For instance, the model 201 indicates that for a week having an average outside temperature of 30 degrees, A kWh will be consumed. In actuality, building energy consumption on 30-degree average temperature weeks varies about parameter A as bounded by the shaded distribution area 205, but the variance about A of the baseline energy consumption data points used to develop the baseline model 201 is acceptable and sufficient to be employed for purposes of weather normalization, use estimation, use prediction, and validation of energy demand or energy efficiency program compliance.

Accordingly, the profiles 101-102 of FIG. 1 may be normalized to, say, 65 degrees, by subtracting from the weekly energy consumption a model estimate of energy use at the true average weekly temperature, and adding back a model estimate of energy consumption at 65 degrees. These steps are performed for each of the weekly kWh values in both profiles 101-102 according to the equation:

$$\hat{E}(i)=E(i)-M[T(i)]+M[T_{REF}], \text{ where:}$$

$\hat{E}(i)$ is an estimated weather normalized energy consumption for week i, E(i) is the actual energy consumption for week i, T(i) is the average weekly temperature for week i, M[T(i)] is the model estimate of energy consumption for the average weekly temperature T(i), $T_{REF}$ is a reference average weekly temperature, and M[$T_{REF}$] is the model estimate of energy consumption for average weekly temperature $T_{REF}$.

Thus, to normalize profiles 101-102 to 65 degrees, 65 is employed in the model 201 as $T_{REF}$, yielding two energy use profiles that are normalized to 65 degrees, which can be compared or employed in other useful analyses. In other words, weather induced effects have been removed from the baseline energy use profiles 101-102 after normalization to 65 degrees.

The present inventors note, however, that the regression model 201 of FIG. 2 is prevalently employed today, but variations may also be employed to include 4-parameter models where no baseline component 203 is present, or they may also include occupancy effects, which are not included in the present discussion for clarity sake. Variations may also employ well known heating degree days and cooling degree days in lieu of average temperatures, but those variations are not particularly relevant for purposes of the present application.

It is also noted that the granularity of baseline energy consumption data may be varied as well to develop a regression model. For example, rather than employing weekly energy consumption values to develop a baseline model for normalization purposes, monthly or daily values may be employed as well to provide insight into energy consumption of the exemplary building at a granularity that is required for a given analysis application.

The present inventors have observed, though, that the present day modeling techniques discussed above with reference to FIGS. 1-2 work well and are widely accepted within the art when they are employed using baseline energy consumption data having granularities of one day or greater, however, when energy use data points having granularities less than one day are employed, the resulting models are quite useless and misleading. These problems are more specifically discussed with reference to FIG. 3.

Referring to FIG. 3, a block diagram 300 is presented featuring an exemplary present day 5-parameter regression baseline model 301 for the exemplary building of FIG. 1, which is derived from an exemplary energy consumption profile (not shown) consisting of fine-grained energy consumption data, that is, energy consumption data that is obtained at intervals generally less than one day (e.g., every 12 hours, every 3 hours, every hour). The model 301 includes a linear heating component 302 that is characterized by an intercept A and a heating slope B. The model 301 also has a baseline consumption component 303 that is characterized by a heating change point C and a cooling change point E. The model 301 further includes a linear cooling component 304 that is characterized by a cooling slope D. Also shown in the diagram 300 is a shaded distribution area 305 that depicts the distribution boundaries of the energy consumption values obtained for the exemplary building and, in contrast to the shaded distribution area 205 of FIG. 2, the distribution area 305 of FIG. 3 shows that the baseline energy consumption data used to generate the model 301 varies substantially from the model 301 itself. And the present inventors have observed that no amount of energy consumption data taken at a fine granularity will improve the accuracy of the model 301, primarily because the distribution of baseline energy consumption values for any of the outside temperatures appears as noise, which conceals any accurate model parameters that may be characterized therein.

Consequently, even though conventional weather normalization regression techniques have proved accurate and useful when employed to derive baseline models from coarse-grained energy use data (i.e., data with granularity equal to or greater than 24 hours), they utterly fail to yield model parameters that can be used to reliably and accurately estimate building energy consumption as a function of outside air temperature. This is a significant problem, for use of such a model, like model 301, to normalize fine-grained energy use data for purposes of comparison, estimation, or prediction, will result in gross error.

The present inventors have further observed that present day weather normalization techniques, such as those discussed above with reference to FIGS. 1-3, are limiting in that they do not take in to consideration the energy lag of a building. Not to be confused with thermal lag, which describes a body's thermal mass with respect to time, energy lag according to the present invention describes a building's transient energy consumption characteristics over time as a function of outside temperature. More specifically, a building's energy lag is the time required for the building's energy consumption to go through a transient energy consumption response in order to reach its steady state energy consumption. As one skilled in the art will concur, the energy lag of a building is not just associated with thermal mass, but is also a function of its internal HVAC components and building management system, which operate to optimize energy consumption. In other words, the present inventors have noted that conventional weather normalization techniques are accurate and useful as long as the intervals of energy use data obtained are greater than the energy lag of a given building, because only steady state energy consumption effects are comprehended by present day normalization mechanisms. However, when the energy lag of a building is greater than the interval at which energy data is obtained, accuracy and reliability of a model 301 derived via conventional normalization mechanisms is substantially decreased to the point of uselessness. Although the above noted period of time is referred to as an energy lag, the present inventors note that the value of this period may be positive or negative. For example, a positive energy lag would describe a building having a transient energy consumption period following a change in outside temperature. Alternatively, a negative energy lag would describe a building having a transient energy consumption period preceding a change in outside temperature. Although not common, buildings having negative energy lags may often comprise HVAC components that perform, say, preemptive cooling or heating.

The present invention overcomes the above noted limitations and disadvantages of the prior art, and others, by providing apparatus and methods for characterizing and creating accurate and reliable models of building energy consumption that are derived from fine-grained energy consumption data, namely, data obtained at intervals which are less than the energy lag of the building under consideration. For most SMBs, intervals on the order of one hour would otherwise result in the noisy distribution area 305 of FIG. 3 because the energy lag of such SMBs is greater than one hour, though the present inventors also note that a noisy distribution 305 may also result from using baseline data having 24-hour (or greater) granularity for extremely large facilities (e.g., enclosed stadiums), or facilities having very inefficient energy use responses to changes in outside temperature.

The present inventors have further observed that when energy consumption data is shifted in time relative to outside temperature data in a baseline at an amount approximately equal to a building's energy lag, and when regression analyses are performed on this shifted data, noisy distribution areas such as area 305 of FIG. 3 tend to converge to boundaries approaching acceptable amounts, such as area 205 of FIG. 2. Accordingly, it is an objective of the present invention to determine a building's energy lag and to employ its energy lag when generating weather normalization model parameters. The present invention will now be discussed with reference to FIGS. 4-9.

Figure 4:
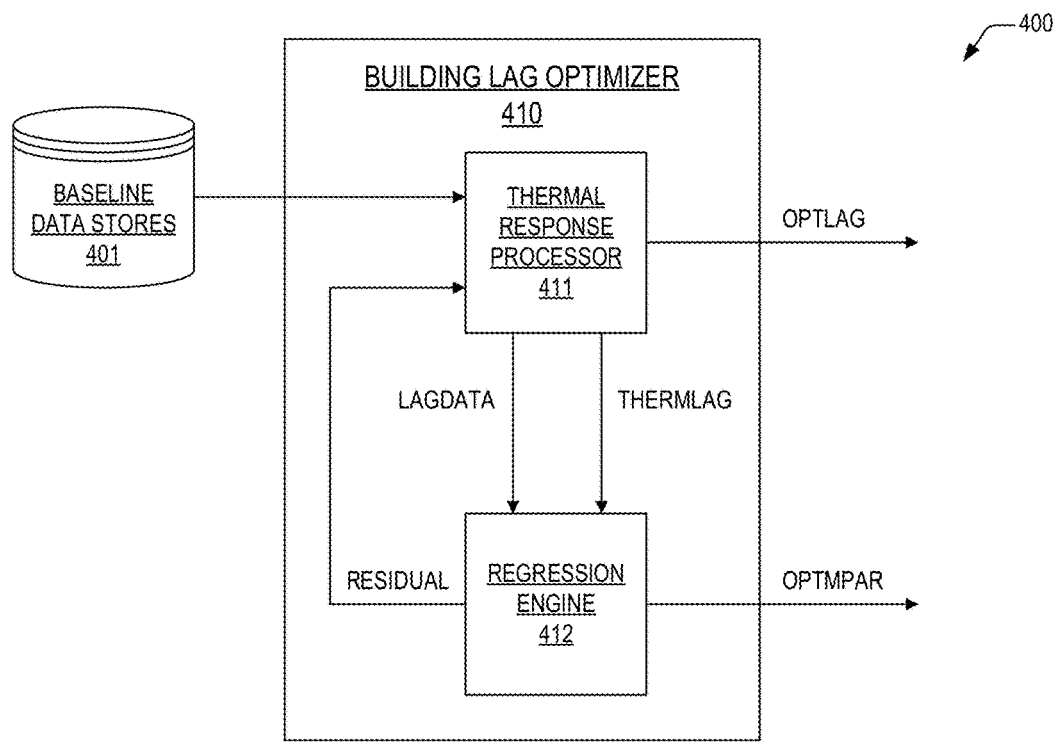
FIG. 4 is a block diagram showing a fine-grained baseline energy data weather normalization apparatus according to the present invention.

Referring now to FIG. 4, a block diagram is presented showing a fine-grained baseline energy data weather normalization apparatus 400 according to the present invention. The apparatus 400 includes a baseline data stores 401 that is coupled to a building lag optimizer 410. The optimizer 410 includes a thermal response processor 411 and a regression engine 412. The processor 411 is coupled to the regression engine 412 via a thermal lag bus THERMLAG, a lag data bus LAGDATA, and a residual bus RESIDUAL. The lag optimizer 410 generates outputs signals indicating values on an optimum lag bus OPTLAG and on an optimum parameters bus OPTPAR.

The baseline data stores 401 comprises fine-grained baseline energy consumption data corresponding to one or more buildings (or, "facilities"), where there is a sufficient amount of consumption data for each of the one or more buildings to enable an accurate energy consumption baseline regression model to be generated for each of the one or more buildings. In one embodiment, granularity of fine-grained baseline energy consumption data corresponding to some of the one or more buildings is one hour. In another embodiment, granularity of fine-grained baseline energy consumption data corresponding to some of the one or more buildings is 15 minutes. Other embodiments contemplate a combination of intervals that would be construed as "fine-grained" according to the present disclosure, such as 24-hour interval data for buildings having energy lags greater than 24 hours. Further embodiments comprehend fine-grained energy consumption data that differs in interval size from building to building within the stores 401. In one embodiment, the stores 401 may be collocated with the building lag optimizer 410 such as, but not limited to, within a network operations center (NOC) corresponding to an energy service company, an independent system operator (ISO), a regional transmission organization (RTO), a transmission system operator (TSO), or any of a number of other concerns that control and monitor operation of an electricity transmission grid. Other embodiments of the present invention contemplate deployment of the apparatus 400 within like-functioned facilities corresponding to control and monitoring of other energy sources as noted above. In all embodiments, the baseline energy consumption data for each of the one or more buildings comprises a time of day value or other type or value from which granularity of the baseline energy consumption data may be determined. Likewise, all embodiments comprise an outside temperature value corresponding to each data point of energy consumption for each of the one or more buildings.

In operation, the regression engine 412 functions to generate energy consumption baseline regression models characterized by model parameters for one or more fine-grained baseline energy consumption profiles, as are discussed above. Embodiments of the regression engine 412 comprehend a 5-parameter multivariable regression model that minimizes its residual term, or a 4-parameter multivariable regression model that minimizes its residual term, or other multivariable regression techniques that are known in the art for use in developing baseline energy consumption models. In one embodiment, the regression engine 412 may comprise a combination of the above noted regression models.

Baseline energy consumption data for a selected one of the one or more buildings may be downloaded to the thermal response processor 411 or the consumption data may be streamed over a network of interconnections known in the art. In addition, the thermal response processor 411 may be configured to accept downloaded or streamed data for a plurality of the one or more buildings simultaneously and may be employed to control the regression engine 412 for purposes of determining an optimal energy lag for one or each of the plurality of the one or more buildings whose baseline energy consumption data are obtained via the stores 401. For purposes of clarity, operation of the thermal response processor 411 will be discussed with reference to generation of an optimum energy lag and associated optimum regression model parameters corresponding to a single one of the one or more buildings.

Responsive to baseline energy consumption data that is received from the baseline data stores 401, the thermal response processor 411 provides the data to the regression engine 412 over LAGDATA along with a first value on THERMLAG that indicates an amount of time lag to shift energy consumption data relative to time stamp and outside temperature values in the baseline data. The first value on THERMLAG may be a time of day, or may merely be an integer value indicating how many increments to shift energy consumption data so that it lags the time and temperature values in the baseline data by that number of increments.

Upon reception of the baseline data on LAGDATA and a first lag value on THERMLAG, the regression engine 412 performs a regression function as noted above to generate first model parameters and a first residual for a first corresponding model to be employed for analysis purposes. The first model parameters are output to bus OPTMPAR and the first residual is provided to the response processor 411 on bus RESIDUAL.

In a second iteration, the processor 411 generates an second value on THERMLAG that results in a corresponding shift in the energy consumption data relative to the time stamp and outside temperature values of the baseline data. The second value, in one embodiment, is an increment of the first value. Responsively, the regression engine 412 generates second model parameters and a second residual for a second corresponding model to be employed for analysis purposes. The second model parameters are output to bus OPTMPAR and the second residual is provided to the response processor 411 on bus RESIDUAL.

The iterations of energy lag continue, with generation of respective model parameters, lag values, and residuals until a lag threshold has been reached indicating that the baseline energy consumption data has been shifted a number of increments greater than an estimated energy lag of the building being modeled. In an embodiment that is using energy baseline data in 1-hour increments, 24 iterations may be performed, thus generating 24 thermal lag values and 24 sets of regression model parameters (e.g., parameters A-E in FIGS. 2-3).

Upon completion of the iterations, the thermal response processor 411 compares all of the residuals generated by each of the above iterations, and determines which one of the residuals is less than all of the other residuals. The lag value that corresponds to the minimum value residual resulting from all of the above iterations corresponds to the energy lag of the building under consideration, and that lag value is output on bus OPTLAG along with model parameters that were generated using that lag value.

The present inventors note that other embodiments of the building lag optimizer 410 contemplate variations of the thermal response processor 411 that perform shifting of the baseline consumption data itself relative to time stamp and temperature data, and that receives model parameters from the regression engine 411, and which generates both values on OPTLAG and OPTMPAR. Via such embodiments a conventional regression engine 412 may be employed as opposed to one that performed the additional functions of time shifting the energy consumption data.

The building lag optimizer 410 according to the present invention is configured to perform the functions and operations as discussed above. The optimizer 410 may comprise logic, circuits, devices, or application programs (i.e., software) disposed within a non-transitory medium such as a hard disk or non-volatile memory, or a combination of logic, circuits, devices, or application programs, or equivalent elements that are employed to execute the functions and operations according to the present invention as noted. The elements employed to accomplish these operations and functions within the building lag optimizer 410 may be shared with other circuits, logic, etc., that are employed to perform other functions and/or operations commensurate with intended application.

Figure 5:
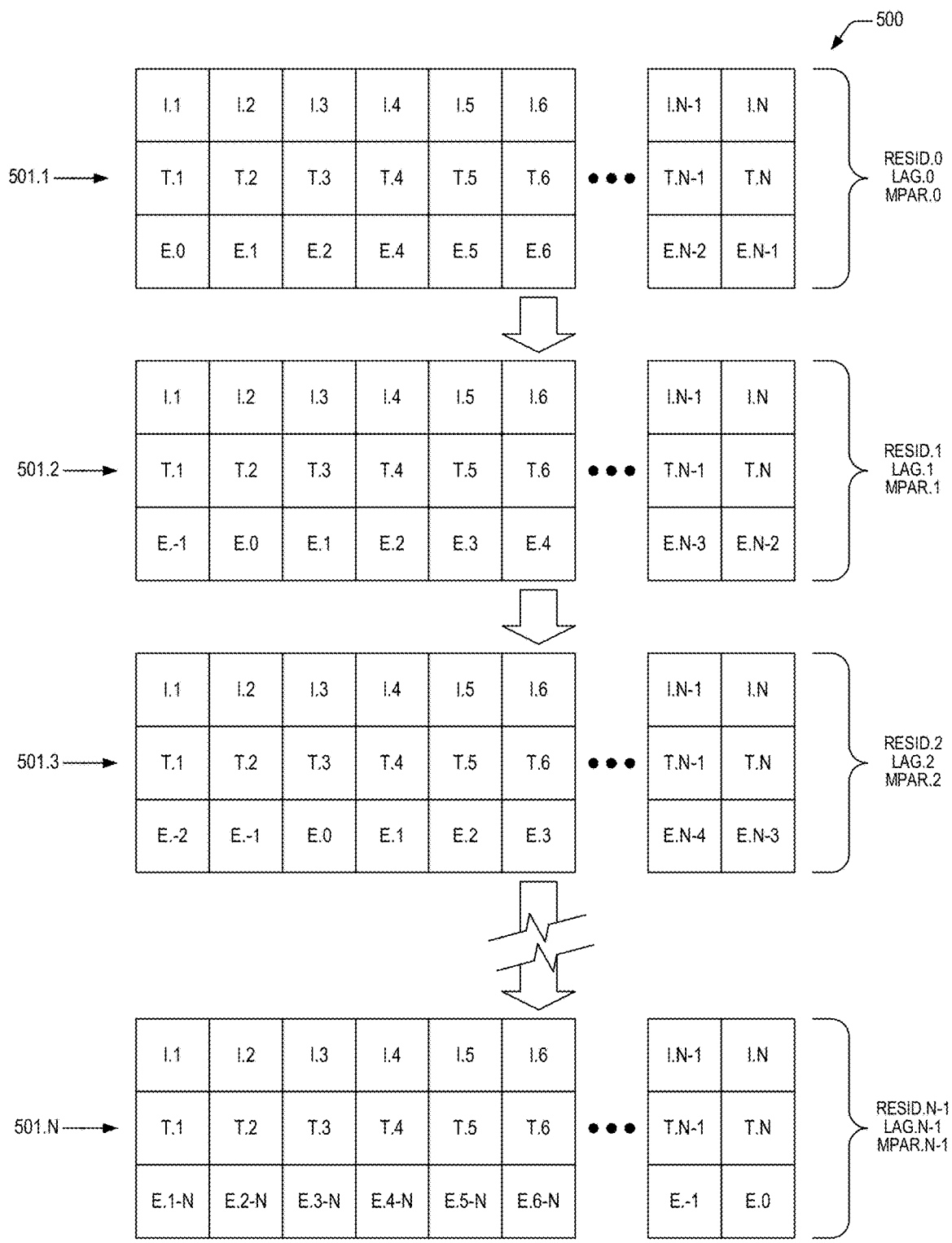
FIG. 5 is a diagram illustrating a fine-grained baseline energy data weather normalization method according to the present invention.

Now turning to FIG. 5, a diagram 500 is presented illustrating a fine-grained baseline energy data weather normalization method according to the present invention, such as may be employed in the building lag optimizer 410 of FIG. 4. The diagram 500 depicts a plurality of time shifted versions 501.1-501.N−1 of a portion of an exemplary energy consumption baseline profile, where it is noted that the exemplary energy consumption baseline profile comprises a number of data points equal to or greater than 2N−1, and wherein successively increasing values of index correspond to later points in time. That is, for baseline data having intervals of 1 hour, an index of 3 (e.g. I.3, T.3, E.3) comprises energy consumption data that is one hour later than baseline data having an index of 2 (e.g., I.2, T.2, E.2). Each of the time shifted versions 501.1-501.N−1 comprises N time stamps I.1-I.N−1, N outside temperature values T.1-T.N−1, and N energy consumption values E.X-E.X+N−1. A first time shifted version 501.1 comprises a 0-index time shift in the portion of the originally obtained baseline energy consumption data. A second time shifted version 501.2 comprises a 1-index time shift. A third time shifted version 501.3 comprises a 2-index time shift. And so on until an Nth time shifted version 501.N comprises an N−1-index time shift.

According to the present invention, a lag LAG.0-LAG.N−1 equal to the time shift is recorded, and multiple regression model parameters MPAR.0-MPAR.N−1 and residuals RESID.0-RESID.N−1 are generated by the regression engine 412. The thermal response processor 411 then compares all N residuals and selects the one having the least value as the optimum residual. Accordingly, the lag value and model parameters corresponding to the optimum residual are designated as the optimum energy lag and optimum regression model parameters for the building under consideration. Henceforth, when analyses are performed for the building under consideration, the optimum regression model parameters and optimal energy lag are employed to perform weather normalization comparisons, efficiency analyses, consumption predictions, validations, etc.

The techniques discussed above with reference to FIGS. 4-5 disclose specific embodiments for performing the functions required on one or more sets of baseline energy consumption data in order to determine a given building's energy lag along with optimum multiple regression model parameters that may be employed to perform weather normalization and other useful applications. However, the present inventors note that the steps described above are exemplary of other mechanisms that may be employed to shift baseline data relative to outside temperature in order to identify a building's energy lag (i.e., the time associated with a least-valued residual within a plurality of residuals corresponding to a plurality of mutually exclusive shifts in time of the baseline data), and to derive therefrom optimal regression model parameters. What one skilled in the art will appreciate from the above disclosure is that essential features of the present invention are performing a plurality of multiple variable regressions yielding a corresponding plurality of residuals, where each of the plurality of multiple variable regressions is associated with a time shift of energy consumption baseline data that is mutually exclusive of remaining time shifts associated with remaining multiple variable regressions within the plurality of multiple variable regressions.

The present inventors also note that multiple variable regression analysis techniques are presented above with reference to the present invention in order to teach relevant aspects using prevalently known mechanisms in the art. However, it is noted that the present invention may also be embodied within configurations that utilize techniques other than multiple variable regression analysis in order to derive modeling parameters that accurately characterize a building's energy consumption and energy lag. Such techniques may include, but are not limited to, as one skilled in the art will appreciate, more than one statistical technique may be used to produce an approximation of a building's dependent energy relation with weather and lag. Any such technique is formalized as a function of independent parameters that describe baseline energy consumption data for the building relative to outside temperature and unknown mutually exclusive shifts in time of the baseline data's parameters. The difference between observed values of energy consumption and estimated values of energy consumption associated with such a function is a quantity that one skilled in the art seeks to minimize in order to improve model accuracy. Although the residuals are employed herein as a measure of goodness-of-fit, the present inventors note that other variables are contemplated by the present invention which include, but are not limited to, linear models of more or less parameters, non-linear models of a parabolic or higher polynomial order as well as machine learning modeling techniques (e.g., neural-networks, decision trees, etc.).

In addition to the embodiments discussed above with reference to FIGS. 4-5, the present invention may also be configured to perform useful and valuable functions when applied to other embodiments, which will be described below with reference to FIGS. 6-9.

Figure 6:
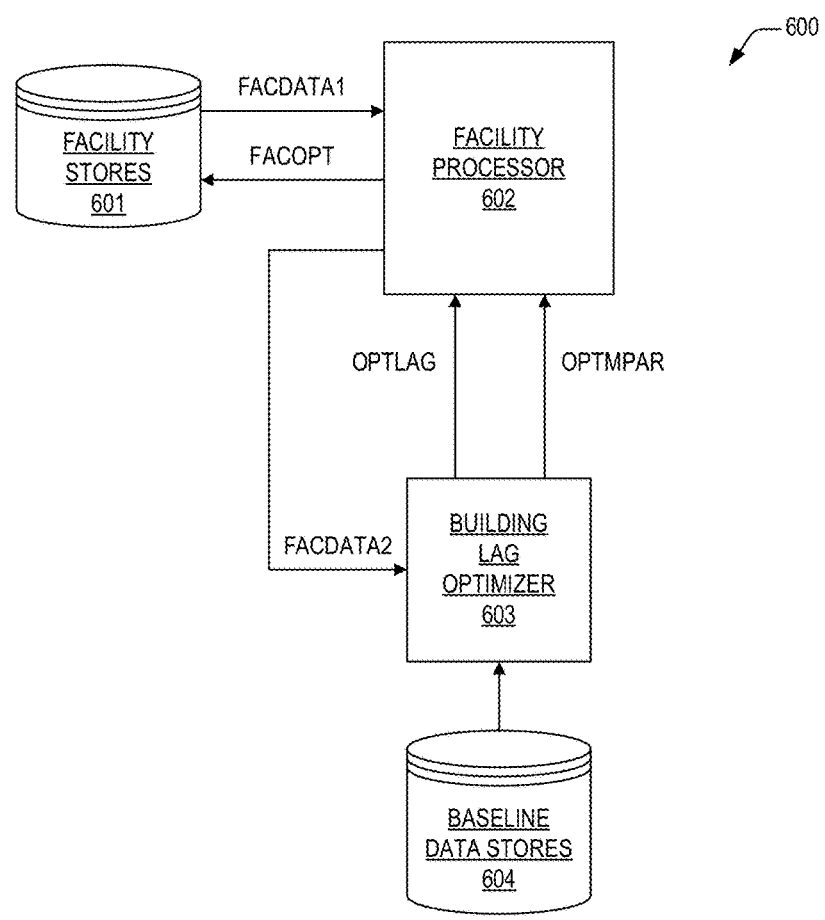
FIG. 6 is a block diagram detailing a weather induced facility energy consumption characterization system according to the present invention.

Referring now to FIG. 6, a block diagram is presented detailing a weather induced facility energy consumption characterization system 600 according to the present invention. The system 600 includes a facility stores 601 that is coupled to a facility processor 602 via a first facility data bus FACDATA1 and a facility optimal features bus FACOPT. The facility processor 602 is coupled to a building lag optimizer 603 via a second facility data bus FACDATA2, an optimal lag bus OPTLAG, and an optimal model parameters bus OPTMPAR. The building lag optimizer 603 is coupled to a baseline data stores 604.

The facility stores 601 comprises identification data corresponding to one or more buildings to allow for characterization data to be associated therewith, and to allow for selection of corresponding baseline energy consumption data that is stored in the baseline data stores 604. In one embodiment, the baseline data stores 604 comprises fine-grained baseline energy consumption data corresponding to the one or more buildings as described earlier, and functions in substantially the same manner as the baseline data stores 401 described above with reference to FIG. 4. In another embodiment, the facility data stores 601 and baseline data stores 604 may share common hardware and software for archival and access purposes.

Operationally, the characterization system 600 is employed to determine characterizing features of the one or more buildings which include, but are not limited to, energy lag and optimal multiple regression baseline model parameters as are described above. The facility processor 602 retrieves facility data from the facility stores 601 for a selected building and provides this data to the lag optimizer 604 on FACDATA2. Responsively, the lag optimizer 603 retrieves one or more sets of energy consumption baseline data corresponding to the selected building from the baseline data stores 604 and performs the functions described above to generate an energy lag for the building along with optimal model parameters. The energy lag is provided to the facility processor 602 on bus OPTLAG and the optimal model parameters are provided on bus OPTMPAR. The facility processor 602 may subsequently select a second building from the one or more buildings and provide its data to the lag optimizer 603 for generation of a second energy lag and second optimal model parameters. The facility processor 602 may subsequently perform these functions for remaining buildings in the facility stores 601. In one embodiment, the facility processor 602 and building lag optimizer 603 may perform the disclosed functions serially for each of the one or more buildings. In another embodiment, the facility processor 602 and lag optimizer 603 may perform the disclosed functions for a plurality of the one or more buildings concurrently.

In one embodiment, the facility processor 602 may provide the energy lags and optimum model parameters for corresponding ones of the one or more buildings to the facility stores 601 via FACOPT, where the energy lags and optimum model parameters are stored and may be henceforth accessed for employment in other applications.

In another embodiment, in addition to providing the energy lags and optimum model parameters for corresponding ones of the one or more buildings to the facility stores 601 via FACOPT, the facility processor 602 may create categories of buildings that have been optimized according to the above. The categories may correspond to a common energy lag (e.g., 1-hour buildings, 2-hour buildings) or they may correspond to ranges of energy lag (e.g., fast buildings (0-4 hours), nominal buildings (5-8 hours), slow buildings (8-12 hours), etc.). The facility processor 602 may provide these categories as well over FACOPT so that buildings having similar energy lags may be identified and their parameters accessed for further application.

Advantageously, the system 600 according to FIG. 6 may be employed to determine useful energy consumption attributes of the one or more buildings without any knowledge whatsoever of the size of the one or more buildings.

Figure 7:
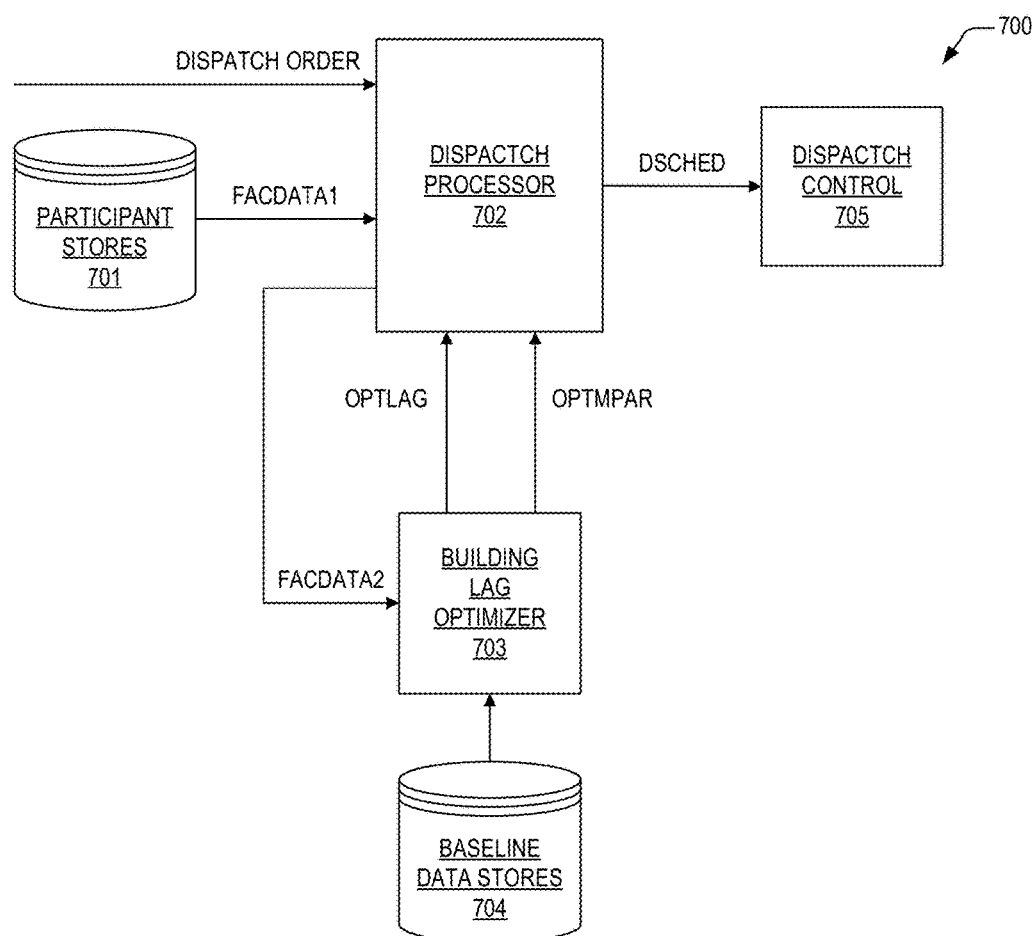
FIG. 7 is a block diagram illustrating a demand response dispatch system according to the present invention.

Turning now to FIG. 7, a block diagram is presented illustrating a demand response dispatch system 700 according to the present invention. The dispatch system 700 may include a dispatch processor 702 that receives a demand response dispatch order from a dispatch authority such as an ISO, RTO, or utility. The dispatch order may specify, among other things, a future time to execute a demand response program event along with a value of energy that is to be shed by participants in a corresponding demand response program. The dispatch processor 702 is coupled to participant stores 701 via a first facility data bus FACDATA1 and to a dispatch control element 705 via bus DSCHED.

The dispatch processor 702 is coupled to a building lag optimizer 703 via a second facility data bus FACDATA2, an optimal lag bus OPTLAG, and an optimal model parameters bus OPTMPAR. The building lag optimizer 703 is coupled to a baseline data stores 704.

The participant stores 701 comprises identification data corresponding to one or more buildings that participate in the demand response program to allow for selection of corresponding baseline energy consumption data that is stored in the baseline data stores 704, to allow for energy lags to be associated therewith, and to further allow for employment of the energy lags in development of a schedule for dispatch control for each of the participants in the program event. In one embodiment, the baseline data stores 704 comprises fine-grained baseline energy consumption data corresponding to the one or more buildings as described earlier, and functions in substantially the same manner as the baseline data stores 401 described above with reference to FIG. 4. In another embodiment, the participant data stores 701 and baseline data stores 704 may share common hardware and software for archival and access purposes.

Operationally, the demand response dispatch system 700 is employed to determine energy lags of the one or more buildings that participate in the demand response program corresponding to the dispatch order. The system 700 also generates a dispatch schedule and performs dispatch for each of the one or more buildings to optimally shed the energy specified in the dispatch order in a timely manner. In one embodiment, the buildings with the highest values of energy lag are dispatched upon commencement of the program event because these buildings are presumed to exhibit a longer transient energy consumption response to changes in outside temperature, and thus they may exhibit a longer transient internal temperature response to abrupt changes in energy consumption, which may achieve demand response program event objectives while preserving comfort levels for internal occupants. Subsequent dispatches are performed in order of decreasing energy lags. One advantage of prioritizing dispatches in the noted order is that the effects of the load shedding for high energy lag buildings may not affect comfort of the occupants therein. The present inventors note, however, that if duration of the program event is longer than energy lags of some of the buildings participating in the program event, comfort levels may be affected.

To generate the above prioritized dispatch schedule, the dispatch processor 702 retrieves facility data from the participant stores 701 for a selected building and provides this data to the lag optimizer 703 on FACDATA2. Responsively, the lag optimizer 703 retrieves one or more sets of energy consumption baseline data corresponding to the selected building from the baseline data stores 704 and performs the functions described above to generate an energy lag for the building along with optimal model parameters. The energy lag is provided to the dispatch processor 702 on bus OPTLAG and the optimal model parameters are provided on bus OPTMPAR. The dispatch processor 702 may subsequently select a second building from the one or more buildings and provide its data to the lag optimizer 703 for generation of a second energy lag and second optimal model parameters. The dispatch processor 702 may subsequently perform these functions for remaining buildings in the participant stores 701. In one embodiment, the dispatch processor 702 and building lag optimizer 703 may perform the disclosed functions serially for each of the one or more buildings. In another embodiment, the dispatch processor 702 and lag optimizer 703 may perform the disclosed functions for a plurality of the one or more buildings concurrently.

In one embodiment, the dispatch processor 702 may employ the energy lags for corresponding ones of the one or more buildings to generate a dispatch schedule where buildings with greater energy lags are dispatched prior to buildings with lesser energy lags. The dispatch schedule is provided to the dispatch control 705 via DSCHED. Upon commencement of the program event, the dispatch control 705 controls the specified load shedding by performing load shedding actions in the order provided for by the dispatch schedule.

Figure 8:
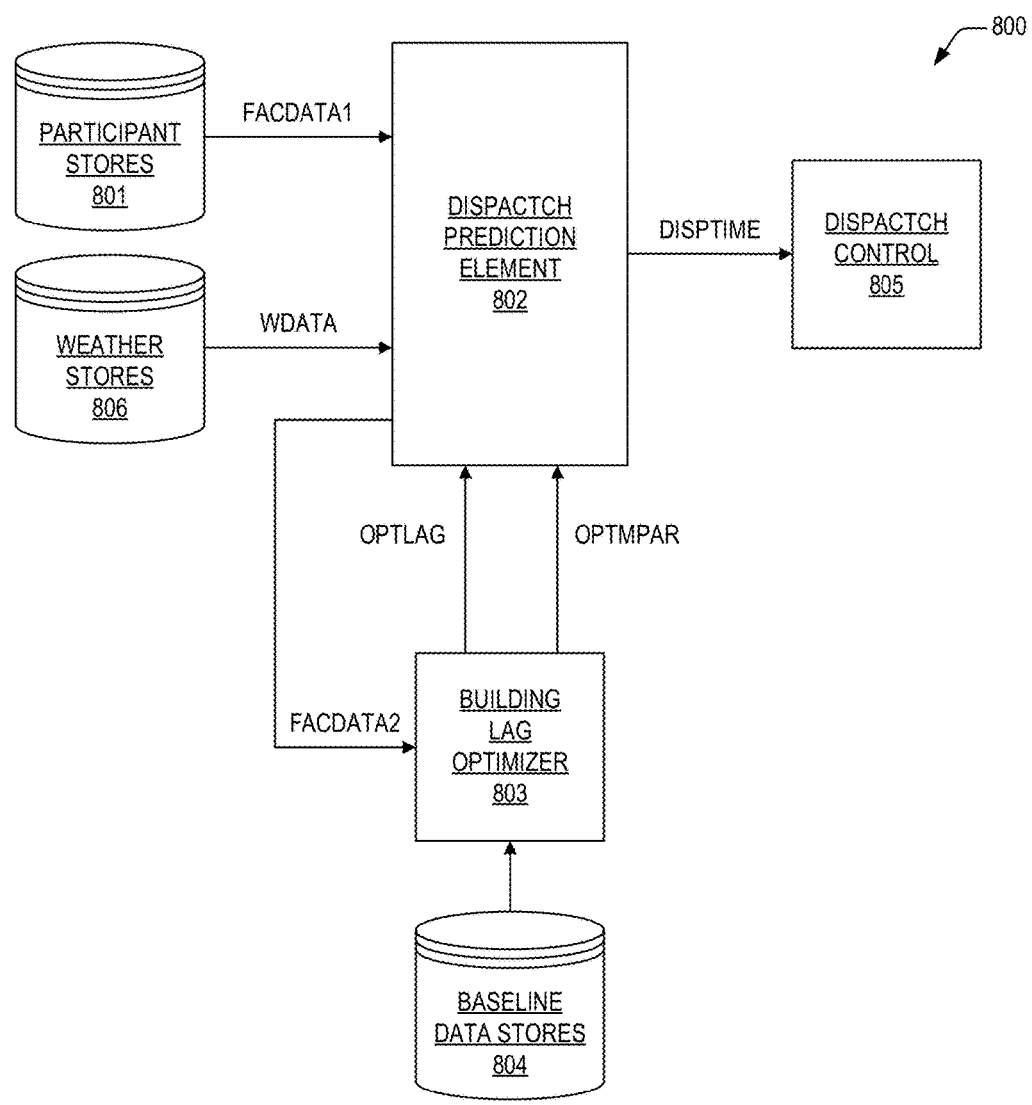
FIG. 8 is a block diagram depicting a demand response dispatch prediction system according to the present invention.

Referring to FIG. 8, a block diagram is presented depicting a demand response dispatch prediction system 800 according to the present invention. The dispatch prediction system 800 may include a dispatch prediction element 802 that is configured to predict a first future time when a demand response dispatch order may be received from a dispatch authority such as an ISO, RTO, or utility. The dispatch order may specify, among other things, a second future time to execute a demand response program event along with a value of energy that is to be shed by participants in a corresponding demand response program. The dispatch prediction element 802 is coupled to participant stores 801 via a first facility data bus FACDATA1 and to a dispatch control element 805 via bus DISPTIME. The dispatch prediction element 802 is also coupled to weather stores 806 via bus WDATA.

The dispatch prediction element 802 is coupled to a building lag optimizer 803 via a second facility data bus FACDATA2, an optimal lag bus OPTLAG, and an optimal model parameters bus OPTMPAR. The building lag optimizer 803 is coupled to a baseline data stores 804.

The weather stores 806 comprises weather predictions that include outside temperatures corresponding to one or more buildings that are stored in the participant stores 801. The weather stores 806 may be located on site, or may be located remotely and accessed via conventional networking technologies.

The participant stores 801 comprises identification data corresponding to one or more buildings that participate in the demand response program to allow for selection of corresponding baseline energy consumption data that is stored in the baseline data stores 804, to allow for energy lags and optimal regression model parameters to be associated therewith, and to further allow for employment of the energy lags and optimal regression model parameters, in conjunction with predicted outside temperatures provided via the weather stores 806, to estimate the first future time when the dispatch order is expected to be received for dispatch control of each of the participants in the program event. In one embodiment, the baseline data stores 804 comprises fine-grained baseline energy consumption data corresponding to the one or more buildings as described earlier, and functions in substantially the same manner as the baseline data stores 401 described above with reference to FIG. 4. In another embodiment, the participant data stores 801 and baseline data stores 804 may share common hardware and software for archival and access purposes.

Operationally, the demand response dispatch prediction system 800 is employed to estimate cumulative energy consumption as a function of the predicted outside temperatures occurring in a timeline for all of the one or more buildings that participate in the demand response program, where energy lags according to the present invention are utilized in generation of a cumulative energy consumption timeline. It is noted that, according to features of the present invention disclosed herein, the predicted energy consumption timeline may be employed to anticipate reception of a dispatch order to a finer level of granularity than that which has heretofore been provided. By using the energy lags associated with the buildings in the participant stores 801, estimated reception of a dispatch may be fine tuned. That is, using conventional dispatch prediction mechanisms that do not take into account energy lags of program participants may result in predicted dispatch reception times that are much earlier than necessary. Advantageously, by utilizing the present invention to determine a time when a dispatch threshold of energy consumption will be reached due to outside temperature, an energy services company or other demand response dispatch control entity may be provided with, say, additional hours for preparation of dispatch control actions.

The system 800 generates a predicted dispatch time that is provided to the dispatch control 805 for preparation of actions required to control each of the one or more buildings to optimally shed the energy specified in the dispatch order, upon reception of the dispatch order.

To predict the dispatch time, the dispatch prediction element 802 retrieves facility data from the participant stores 801 for a selected building and provides this data to the lag optimizer 803 on FACDATA2. Responsively, the lag optimizer 803 retrieves one or more sets of energy consumption baseline data corresponding to the selected building from the baseline data stores 804 and performs the functions described above to generate an energy lag for the building along with optimal model parameters. The energy lag is provided to the dispatch prediction element 802 on bus OPTLAG and the optimal model parameters are provided on bus OPTMPAR. The dispatch prediction element 802 subsequently selects a second building from the one or more buildings and provides its data to the lag optimizer 803 for generation of a second energy lag and second optimal model parameters. The dispatch prediction element 802 may subsequently perform these functions for remaining buildings in the participant stores 801. In one embodiment, the dispatch prediction element 802 and building lag optimizer 803 may perform the disclosed functions serially for each of the one or more buildings. In another embodiment, the dispatch prediction element 802 and lag optimizer 803 may perform the disclosed functions for a plurality of the one or more buildings concurrently.

Once the energy lags and optimal model parameters have been generated for all of the buildings in the participant stores 801, the dispatch prediction element 802 accesses the weather stores 806 to obtain future outside temperatures corresponding to each of the one or more buildings for a specified future time period. The dispatch predication element 802 then builds a cumulative future energy consumption timeline for all of the buildings using the outside temperatures as inputs to energy consumption models according to the present invention for all of the buildings. The dispatch prediction element 802 then processes the cumulative energy consumption timeline to determine a time when cumulative energy consumption increases as to cross a specified threshold known to trigger a demand response program event. The point at which consumption crosses the specified threshold is tagged as a dispatch time. From the dispatch time, the dispatch prediction element 802 may utilize demand response program contract data stored therein to calculate a predicted dispatch reception time, typically 24 hours prior to commencement of the demand response program event. The dispatch reception time is provided to the dispatch control element 805 on bus DISPTIME to allow for commencement of dispatch actions at a time having greater accuracy than that which has heretofore been provided.

Figure 9:
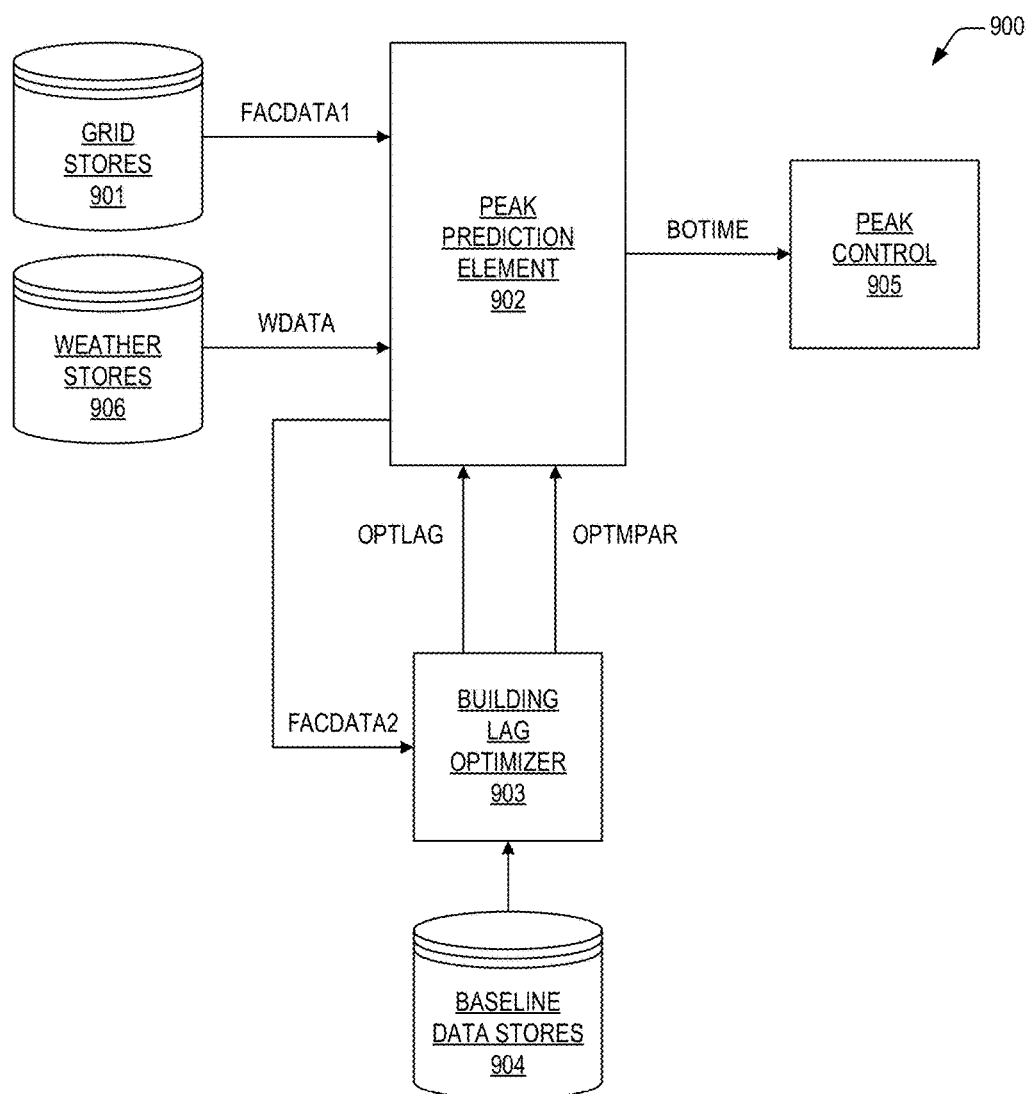
FIG. 9 is a block diagram featuring a brown out prediction system according to the present invention.

Finally turning to FIG. 9, a block diagram is presented featuring a brown out prediction system 900 according to the present invention. The brown out prediction system 900 may include a peak prediction element 902 that is configured to predict a future brown out time when energy consumption on a grid controlled by an ISO, RTO, or utility, may exceed normal production capacity, and would thereby require exceptional measures known in the art to increase energy capacity. The peak prediction element 902 is coupled to grid stores 901 via a first facility data bus FACDATA1 and to a peak control element 905 via bus BOTIME. The peak prediction element 902 is also coupled to weather stores 906 via bus WDATA.

The peak prediction element 902 is coupled to a building lag optimizer 903 via a second facility data bus FACDATA2, an optimal lag bus OPTLAG, and an optimal model parameters bus OPTMPAR. The building lag optimizer 903 is coupled to a baseline data stores 904.

The weather stores 906 comprises weather predictions that include outside temperatures corresponding to buildings that are stored in the grid stores 901. The weather stores 906 may be located on site, or may be located remotely and accessed via conventional networking technologies.

The grid stores 901 comprises identification data corresponding to buildings or aggregates of buildings that are part of the grid to allow for selection of corresponding baseline energy consumption data that is stored in the baseline data stores 904, to allow for energy lags and optimal regression model parameters to be associated therewith, and to further allow for employment of the energy lags and optimal regression model parameters, in conjunction with predicted outside temperatures provided via the weather stores 906, to estimate the future brown out time. For purposes of this discussion, aggregates of buildings may correspond to a unit of distribution over the grid such as, but not limited to, an electrical substation. As the present invention has been applied above to determine energy lags and optimal model parameters associated with single buildings, the present invention may also be applied to groups of buildings, say, a plurality of houses and business that are all powered from the same substation. Accordingly, the substation itself may be treated as a building for purposes of determining an energy lag and optimal model parameters. Henceforth, an aggregate of buildings will be simply referred to as a building.

In one embodiment, the baseline data stores 904 comprises fine-grained baseline energy consumption data corresponding to the buildings as described earlier, and functions in substantially the same manner as the baseline data stores 401 described above with reference to FIG. 4. In another embodiment, the grid stores 901 and baseline data stores 904 may share common hardware and software for archival and access purposes.

Operationally, the brown out prediction system 900 is employed to estimate cumulative energy consumption on the grid as a function of the predicted outside temperatures occurring in a timeline for all of the buildings within the grid, where energy lags according to the present invention are utilized in generation of a cumulative energy consumption timeline. It is noted that, according to features of the present invention disclosed herein, the predicted energy consumption timeline may be employed to anticipate activation of the exceptional measures to a finer level of granularity than that which has heretofore been provided. By using the energy lags associated with the buildings in the grid stores 901, estimated time of occurrence of exceeding nominal production capacity may be fine tuned. That is, using conventional brown out prediction mechanisms that do not take into account energy lags of grid consumers may result in predicted brown out times that are much sooner than they actually occur. Advantageously, by utilizing the present invention to determine a time when a peak threshold of energy consumption will be reached due to outside temperature, a grid control entity may be provided with, say, additional hours to manage peak consumption on the grid.

The system 900 generates a predicted brown out time that is provided to the peak control 905 for preparation of exceptional measures required to manage peak consumption.

To predict the brown out time, the peak prediction element 902 retrieves building data from the grid stores 901 for a selected building and provides this data to the lag optimizer 903 on FACDATA2. Responsively, the lag optimizer 903 retrieves one or more sets of energy consumption baseline data corresponding to the selected building from the baseline data stores 904 and performs the functions described above to generate an energy lag for the building along with optimal model parameters. The energy lag is provided to the peak prediction element 902 on bus OPTLAG and the optimal model parameters are provided on bus OPTMPAR. The peak prediction element 902 subsequently selects a second building and provides its data to the lag optimizer 903 for generation of a second energy lag and second optimal model parameters. The peak prediction element 902 subsequently performs these functions for remaining buildings in the grid stores 901. In one embodiment, the peak prediction element 902 and building lag optimizer 903 may perform the disclosed functions serially for each of the one or more buildings. In another embodiment, the dispatch prediction element 902 and lag optimizer 903 may perform the disclosed functions for a plurality of the one or more buildings concurrently.

Once the energy lags and optimal model parameters have been generated for all of the buildings in the grid stores 901, the peak prediction element 902 accesses the weather stores 902 to obtain future outside temperatures corresponding to each of the one or more buildings for a specified future time period. The peak predication element 902 then builds a cumulative future energy consumption timeline for all of the buildings using the outside temperatures as inputs to energy consumption models according to the present invention for all of the buildings. The peak prediction element 902 then processes the cumulative energy consumption timeline to determine a time when cumulative energy consumption increases as to cross a specified threshold known to trigger the exceptional measures. The point at which consumption crosses the specified threshold is tagged as a brown out time. The brown out time is provided to the peak control element 905 on bus BOTIME to allow for commencement of the exceptional measures at a time having greater accuracy than that which has heretofore been provided.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Throughout this disclosure, exemplary techniques and mechanisms have been employed in order to clearly teach features of the present invention. For instance, the thermal response processor discussed with reference to FIGS. 4-5 is described in terms of a linear search to find the optimal building energy lag, however the present inventors note that the present invention comprehends many other techniques for finding optimal energy lag parameters that may be more efficiently employed in accordance with system configuration. These techniques may include, but are not limited to, bisection methods, Newton's method, and thermal annealing methods.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A demand response dispatch system, comprising:
baseline data storages, configured to store a plurality of baseline energy use data sets for buildings participating in a demand response program;
a building lag optimizer circuit, configured to receive identifiers for said buildings, and configured to retrieve said plurality of energy use data sets from said baseline data storages for said buildings, and configured to generate energy use data sets for each of said buildings, each of said energy use data sets comprising energy consumption values along with corresponding time and outside temperature values, wherein said corresponding time values comprise hourly values, and wherein said energy consumption values within said each of said energy use data sets are shifted by one of a plurality of lag values relative to said corresponding time and outside temperature values, and wherein each of said plurality of lag values is different from other ones of said plurality of lag values, and wherein said plurality of lag values indicates shifts of said energy consumption value to different time and outside temperature values, and configured to perform a regression analysis on said each of said energy use data sets to yield corresponding regression model parameters and a corresponding residual, and configured to determine a least valued residual from all residuals yielded, said least valued residual indicating a corresponding energy lag for said each of said buildings, and regression model parameters that correspond to said least valued residual, and wherein said corresponding energy lag describes a transient energy consumption period preceding a change in outside temperature;
a dispatch processor, coupled to said building lag optimizer circuit, configured to receive a plurality of energy lags, each corresponding to one of said buildings, and configured to generate a dispatch schedule for a demand response program event according to a prioritization of said plurality of energy lags; and
a dispatch control circuit, coupled to said dispatch processor, configured to control a specified load shedding by performing load shedding actions in the order provided by said dispatch schedule, wherein said dispatch schedule directs for dispatch of ones of said buildings having greater energy lags prior to others of said buildings having lesser energy lags, wherein said dispatch schedule enables said dispatch control circuit to perform dispatch of said buildings to optimally shed energy specified in a dispatch order in a timely manner.

2. The system as recited in claim 1, wherein said corresponding time values are less than or equal to said each of said plurality of energy lags.

3. The system as recited in claim 1, wherein said plurality of lag values spans a 24-hour period.

4. The system as recited in claim 1, wherein said each of said energy use data sets comprises a first portion of a corresponding each of said plurality of baseline energy use data sets, and wherein required energy consumption values resulting from shifts are taken from a second portion of said corresponding each of said plurality of baseline energy use data sets.

5. A system for dispatching buildings participating in a demand response program event, the system comprising:
baseline data storages, configured to store a plurality of baseline energy use data sets for the buildings;
a building lag optimizer circuit, configured to determine an energy lag for one of said buildings, said building lag optimizer circuit comprising:
a thermal response processor, configured to generate a plurality of energy use data sets for said one of the buildings, each of said plurality of energy use data sets comprising energy consumption values along with corresponding time and outside temperature values, wherein said corresponding time values comprise hourly values, and wherein said energy consumption values within said each of said energy use data sets are shifted by one of a plurality of lag values relative to said corresponding time and outside temperature values, and wherein each of said plurality of lag values is different from other ones of said plurality of lag values, and wherein said plurality of lag values indicates shifts of said energy consumption value to different time and outside temperature values; and
a regression engine circuit, coupled to said thermal response processor, configured to receive said plurality of energy use data sets, and configured to perform a regression analysis on said each of said energy use data sets to yield corresponding regression model parameters and a corresponding residual,
wherein said thermal response processor determines a least valued residual from all residuals yielded by said regression engine circuit, said least valued residual indicating said energy lag for said building, wherein said energy lag describes a transient energy consumption period preceding a change in outside temperature;
a dispatch processor, coupled to said building lag optimizer circuit, configured to receive a plurality of energy lags, each corresponding to one of the buildings, and configured to generate a dispatch schedule for the demand response program event according to a prioritization of said plurality of energy lags; and
a dispatch control circuit, coupled to said dispatch processor, configured to control a specified load shedding by performing load shedding actions in the order provided by said dispatch schedule, wherein said dispatch schedule directs for dispatch of ones of said buildings having greater energy lags prior to others of said buildings having lesser energy lags, wherein said dispatch schedule enables said dispatch control circuit to perform dispatch of said buildings to optimally shed energy specified in a dispatch order in a timely manner.

6. The system as recited in claim 5, wherein said corresponding time values are less than or equal to said each of said plurality of energy lags.

7. The system as recited in claim 5, wherein said plurality of lag values spans a 24-hour period.

8. The system as recited in claim 5, wherein said each of said energy use data sets comprises a first portion of a corresponding each of said plurality of baseline energy use data sets, and wherein required energy consumption values resulting from shifts are taken from a second portion of said corresponding each of said plurality of baseline energy use data sets.

9. A method for dispatching buildings participating in a demand response program event, the method comprising:

retrieving a plurality of baseline energy use data sets for the buildings from a baseline data storages;

generating a plurality of energy use data sets for each of the buildings, each of the plurality of energy use data sets comprising energy consumption values along with corresponding time and outside temperature values, wherein said corresponding time values comprise hourly values, and wherein said energy consumption values within said each of said energy use data sets are shifted by one of a plurality of lag values relative to said corresponding time and outside temperature values, and wherein each of said plurality of lag values is different from other ones of said plurality of lag values, and wherein said plurality of lag values indicates shifts of said energy consumption value to different time and outside temperature values;

performing a regression analysis on the each of the plurality of energy use data sets to yield corresponding regression model parameters and a corresponding residual;

determining a least valued residual from all residuals yielded by the regression analysis, the least valued residual indicating a corresponding energy lag for the each of the buildings, wherein the corresponding energy lag describes a transient energy consumption period preceding a change in outside temperature;

using energy lags for all of the buildings to generate a dispatch schedule for the demand response program event according to a prioritization of the energy lags; and controlling a specified load shedding by performing load shedding actions in the order provided by the dispatch schedule, wherein the dispatch schedule directs for dispatch of ones of the buildings having greater energy lags prior to others of the buildings having lesser energy lags, wherein the dispatch schedule enables a dispatch control circuit to perform dispatch of the buildings to optimally shed energy specified in a dispatch order in a timely manner.

10. The method as recited in claim 9, wherein said corresponding time values are less than or equal to said each of said plurality of energy lags.

11. The method as recited in claim 9, wherein said plurality of lag values spans a 24-hour period.

12. The method as recited in claim 9, wherein the each of the energy use data sets comprises a first portion of a corresponding each of a plurality of baseline energy use data sets, and wherein required energy consumption values resulting from shifts are taken from a second portion of the corresponding each of a plurality of baseline energy use data sets.

* * * * *